US010414376B1

(12) United States Patent
Ghannam et al.

(10) Patent No.: US 10,414,376 B1
(45) Date of Patent: Sep. 17, 2019

(54) SYSTEMS AND METHODS FOR VEHICLE LOCK/UNLOCK ALERTS

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/014,796

(22) Filed: Jun. 21, 2018

(51) Int. Cl.
*B60R 25/24* (2013.01)
*B60R 25/31* (2013.01)
*E05B 39/00* (2006.01)

(52) U.S. Cl.
CPC .............. *B60R 25/24* (2013.01); *B60R 25/31* (2013.01); *E05B 39/00* (2013.01)

(58) Field of Classification Search
CPC ................................. B60R 25/24; E05B 45/00
USPC ........................................................ 340/425.5
See application file for complete search history.

(56) References Cited

U.S. PATENT DOCUMENTS

| 7,170,419 | B2 * | 1/2007 | Masui ..................... B60R 25/00 340/425.5 |
| 7,561,030 | B2 * | 7/2009 | McBride ................. B60R 25/00 307/10.1 |
| 7,825,779 | B2 | 11/2010 | Van Wiemeersch et al. |
| 9,080,348 | B2 * | 7/2015 | Lange ..................... B60R 25/04 |
| 2016/0264097 | A1 * | 9/2016 | Oesterling .............. B60R 25/20 |

FOREIGN PATENT DOCUMENTS

| JP | 2006144432 A | 6/2006 |
| JP | 2008115630 A | 5/2008 |
| JP | 2009256908 A | 11/2009 |

* cited by examiner

*Primary Examiner* — Qutbuddin Ghulamali
(74) *Attorney, Agent, or Firm* — Frank Lollo; Neal, Gerber & Eisenberg LLP; James P. Muraff

(57) ABSTRACT

Method and apparatus are disclosed for providing discrete alerts to a user of the lock status of a vehicle. An example vehicle includes sensors, a communication system, and a processor. The processor is processor configured to receive a lock request from a remote device, responsive to determining that the remote device is within a threshold range, transmit a first alert to the remote device, and responsive to determining that the remote device is outside the threshold range (i) determine that a vehicle situational criteria is met, and (ii) transmit a second alert to the remote device.

17 Claims, 4 Drawing Sheets

SYSTEMS AND METHODS FOR VEHICLE LOCK/UNLOCK ALERTS

TECHNICAL FIELD

The present disclosure generally relates to vehicle locking and unlocking systems and, more specifically, methods and systems for discretely alerting a user of the lock status of a vehicle.

BACKGROUND

Modern vehicles include communication systems that enable them to remotely lock and unlock based on commands received from a key fob, phone, or other connected device. These vehicles also often include sensors to capture information about the surroundings of the vehicle, such as cameras that capture the front and rear views of the vehicle.

In some cases the vehicle may also provide an audible noise or "honk" when the user locks or unlocks the car, so as to indicate to the driver that the vehicle has locked or unlocked. This may occur when a user repeatedly presses or selects the lock button until he or she is certain that the vehicle is actually locked. This audible cue may not always be wanted however, especially when the user does not wish to draw attention to the vehicle and the fact that it will be left unattended in the near future (i.e., when the user locks the vehicle as he or she leaves, causing the vehicle to honk in response).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for providing discrete alerts to a user when he or she locks or unlocks a vehicle remotely, such as via a key fob or smartphone "Phone as a Key" (PaaK) device. An example disclosed vehicle includes sensors, a communication system, and a processor. The processor is configured to receive a lock request from a first device, responsive to determining that the first device is within a threshold range, transmit a first alert to a second device. The processor is also configured to, responsive to determining that the first device is outside the threshold range (i) determine that a vehicle situational criteria is met, and (ii) transmit a second alert to the second device.

Another example disclosed vehicle includes sensors, a communication system, and a processor. The processor is configured to receive a lock request from a remote device, responsive to determining that the remote device is within a threshold range, transmit a first alert to the remote device, and responsive to determining that the remote device is outside the threshold range (i) determine that a vehicle situational criteria is met, and (ii) transmit a second alert to the remote device.

In a third example, a method includes receiving, by a vehicle processor, a lock request from a remote device. The method also includes, responsive to determining that the remote device is within a threshold range, transmitting a first alert. And the method further includes, responsive to determining that the remote device is outside the threshold range (i) determining that a vehicle situational criteria is met, and (ii) transmitting a second alert.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
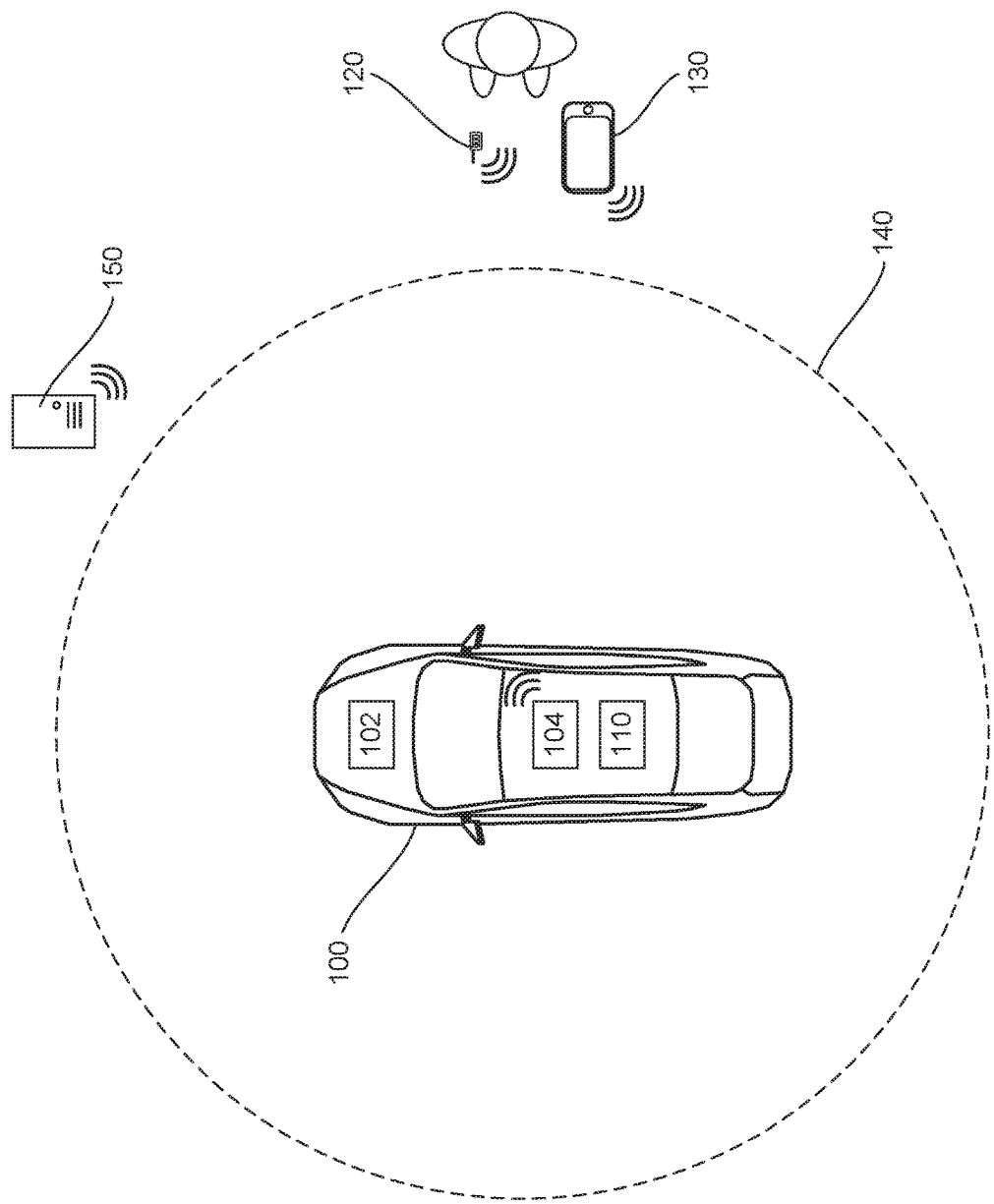
FIG. 1 illustrates an example vehicle lock scenario according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles include the ability to remotely lock and unlock when a user presses a button or selects a lock or unlock command. And further, many vehicles include an audible cue to let the user know that the vehicle has received the command to lock, and has in fact locked the vehicle. This occurs particularly where a user is unsure whether the vehicle is locked, and repeatedly clicks the lock button on his or her key fob or phone out of habit.

In some situations, one or more honks or audible cues may be unwanted. For instance, when the vehicle is parked in a populated area and the user locks the car in the middle of the night, it may bother residents who are trying to sleep. In addition, it may raise safety concerns if unwanted attention is drawn to the vehicle. A would-be assailant or robber may be drawn to the honking noise as an indication that the car's owner has just parked and is leaving the vehicle unattended.

With these issues in mind, example embodiments of the present disclosure may attempt to provide systems, devices, and methods that assure a user of the lock status of the vehicle without causing annoyance or raising safety concerns. To this end, example embodiments may include the ability to recognize a user's lock/unlock command from any computing device, and to transmit a lock status back to the user in a safe and convenient manner without annoying people nearby. Embodiments may include analyzing the vehicle surroundings to determine whether one or more vehicle situational criteria are met (e.g., location, time of day, day of week, etc.), so as to determine what type of alert to provide to the user. The user is thus able to confirm the lock status of the vehicle without an audible honk that may annoy people nearby or alert would be assailants.

In some examples, an analysis of the vehicle situational criteria may include an analysis of and/or by the vehicle itself, such as by using the vehicle camera, GPS system, or other sensors. Data gathered by these sensors may be used to determine whether the vehicle should or should not honk when a lock/unlock command is received.

Alternatively or in addition, there may be situations for which the vehicle sensors are not available, are damaged, or otherwise cannot provide the data needed to determine whether to enable or prevent the vehicle from honking. In these cases, there may be an analysis of the device that transmitted the lock command. For instance, where the user has an application running on his or her smartphone that can lock and unlock the vehicle, one or more device specific criteria may be analyzed, using sensors and information gathered by the device itself. This can include the time/date as reported by the smartphone, the location of the smartphone, the presence of a home Wi-Fi network detected by the smartphone, and various other data. This data may be analyzed to determine whether the vehicle should or should not honk when a lock/unlock command is received.

Further, an analysis of information received by a server communicatively coupled to the vehicle may be analyzed to determine whether or not to honk when the lock/unlock command is received. The vehicle may be configured to routinely update a server with various data, including the vehicle determined location, battery status, and/or various other vehicle metrics. Data stored by the server may be analyzed to determine whether one or more vehicle situational criteria are met, so as to decide whether or not to allow the vehicle to honk when the lock/unlock command is received.

FIG. 1 illustrates an example scenario according to embodiments of the present disclosure. FIG. 1 includes vehicle 100, which may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

Vehicle 100 may include at least one or more sensors 102, a communication system 104, and a processor 110, along with one or more other components or systems not shown in FIG. 1.

Sensors 102 may include, for example, one or more cameras (e.g., front facing, rear facing, side facing, in a rear-view mirror, etc.), a GPS system, one or more seat sensors to detect the presence of a person in the vehicle seats, one or more door sensors to detect whether the vehicle doors are open or closes, a gear sensor to detect the present vehicle gear, a wheel sensor to detect movement of the vehicle, an ignition sensor to detect whether there is a key in the ignition and whether the vehicle is on or off, one or more Bluetooth antennas to communicate with (via the communication system 104) one or more Bluetooth connected devices, and more.

Sensors 102 may be used to gather data about vehicle 100, including one or more vehicle based conditions. The vehicle based conditions may include the location of the vehicle as determined by the vehicle sensors, the local time of the vehicle as determined by the vehicle sensors, whether the vehicle is occupied/unoccupied as determined by the vehicle, whether the vehicle is inside a structure or outside a structure as determined by the vehicle, an ambient light or sound level determined by the vehicle sensors, whether the vehicle is on/off, in gear, parked, etc., and more.

Communication system 104 may include one or more antennas and/or other components configured to transmit and receive information with one or more computing devices and systems.

The antennas of communication system 104 may be Bluetooth antennas, low frequency or high frequency antennas, used for GPS, radio, satellite, navigation, cell phone communication, infrastructure communication, and more. The antennas may be positioned on an exterior or interior of vehicle 100, in one or more doors or door handles, in front or rear bumpers of the vehicle, on top of the vehicle, bottom of vehicle, or any other suitable location.

Communication system 104 may transmit and/or receive information from one or more external devices, such as the key fob 120, smartphone 130, and/or server 150.

In some cases the communication system 104 may be used to pair vehicle 100 with one or more Bluetooth enabled devices (e.g., smartphone 130), and may further be used to determine a position of a paired Bluetooth device and/or connected device such as key fob 120 and smartphone 130.

Processor 110 of vehicle 100 may be configured to carry out one or more actions or functions such as those described in herein. In some examples, processor 110 may be configured to receive a lock and/or unlock request from a remote computing device such as key fob 120 and smartphone 130.

In some examples, the lock/unlock request may be received from key fob 120, while in other example the request may be received from another device such as smartphone 130. Where the request is transmitted by the phone 130, it may be received by communication system 104 either directly, via server 150, or via some other communicative coupling between the vehicle and the device (e.g., Wi-Fi, cellular network, etc.). In some examples, the lock/unlock request may be received from server 150, such as via a user's computer in his or her home, from a manufacturer, or via an OnStar or other vehicle safety company server.

Processor 110 can then determine a location of the device from which lock request was received, or a location of a second device corresponding to the first device from which the request was received.

The location determination can be done in any suitable manner, including for example using received signal strength indication (RSSI), time of flight information (TOF), angle of arrival information (AOA), or via some other method. In addition, the location may be determine based on GPS data or some other positioning system (Wi-Fi, cellular, etc.).

Processor 110 may determine the location of the device from which the request was received (i.e., the first device), or it may determine the location of a second device that corresponds to the first device (i.e., a smartphone of a user of the vehicle). This can be done in particular where a user has a phone paired to the vehicle, but he or she does not use the phone as a key. Instead he or she uses the key fob to lock the vehicle. In this case, the processor may determine the location or distance from vehicle 100 to either the device that sent lock command (key fob 120), or the second device corresponding to device that sent lock command (smartphone 130).

Processor 110 may determine whether the first device and/or second device are within a threshold range 140 of the vehicle 100. This may be determined based on the location of the device as determined above. The threshold range may be any distance, including 5 feet or smaller, up to 30 feet or more. In some examples, the threshold may be tied to a Bluetooth pairing distance for a phone paired to the vehicle. For instance, the threshold range may be set such that outside of pairing range is outside threshold distance from vehicle, while inside pairing range is inside the threshold range. Further, in some examples the threshold range may be a discrete value such as 30 feet, while in other examples the threshold may have a depth, such that from 0-25 feet is inside the threshold range, and from 30 and farther is outside the threshold range. These values are for example only.

If the device is determined to be outside the threshold range 140, processor 110 may transmit a first alert to either the first device, second device, or both. The first alert may be an indication that vehicle lock/unlock command has been carried out, and may include the current lock status of the vehicle. The alert may cause the first and/or second device to emit a visual cue (light, flashing icon, etc.), and audio cue, or a haptic feedback cue such as a buzz.

In one scenario, the first device may be key fob 120 and the second device may be smartphone 130. The user may command the vehicle 100 to lock using the key fob 120, by pressing a button on the key fob 120. The processor 110 may receive the command via the communication system 104. The processor may then determine that the key fob 120 is inside the threshold range 140. Because the key fob 120 is inside the threshold range, the processor 110 may determine that no honk should be done when the vehicle is locked. Instead, the processor may transmit an alert to the key fob 120 indicating that the vehicle 100 is now locked. As noted above, this may be expressed by the key fob 120 as a light or flash, audible noise, haptic feedback buzz, or in some other manner.

In another scenario, the processor 110 may determine that the key fob 120 is inside the threshold range 140, and may transmit an alert to the second device (e.g., smartphone 130) rather than the first device (e.g., key fob 120). The smartphone 130 may be communicatively coupled to the vehicle 100, either via a Bluetooth pairing, a cellular connection via a server such as server 150, a Wi-Fi connection, or via some other mechanism. In some examples, the second device may correspond to the first device or vehicle 100 in some manner. For instance, the vehicle 100 may store an account associated with the first device and the second device (e.g., a given driver may have his or her own set of keys and phone which are associated with each other and the vehicle). In some examples, the second device may be the last or most recently paired device with the vehicle.

In a third scenario, the user may request to lock the vehicle 100 using the smartphone 130. In this case, the vehicle may receive the command, determine that the smartphone 130 is inside the threshold range (i.e., that the device requesting the lock is inside the threshold range), and responsively transmit the alert back to the smartphone 130.

Smartphone 130 may receive the alert indicating that the lock command has been received and is currently being or has been carried out. The alert may indicate the lock status of the vehicle, and may include a visual alert, audible alert, and/or haptic feedback alert (buzz). In some examples, smartphone 130 may receive the alert via a Bluetooth pairing with vehicle 100. Alternatively, smartphone 130 may receive the alert via a cellular network connection, Wi-Fi connection, or some other communicative coupling to vehicle 100 (possibly via server 150).

In some examples, the processor 110 may determine whether the vehicle 100 is occupied or unoccupied, and/or whether a specific seat of the vehicle (e.g., the driver's seat) is occupied or unoccupied, prior to sending the first alert. Vehicle sensor data may be used, including from one or more seat sensors, ignition sensor, cameras, and more. The first alert may then be sent responsive to determining both that the device requesting the lock/unlock action has been received, and that driver's seat is unoccupied. This can prevent unwanted locking or unlocking actions and alerts from being sent when the driver is still present in the vehicle.

Processor 110 may also determine that the first and/or second device is not within the threshold range 140. And in response, processor 110 may determine whether one or more vehicle situational criteria are met.

Vehicle situational criteria may be used to decide whether the vehicle should honk or not when it carries out a lock/unlock action, and may include a location of the vehicle, the local time at the vehicle, the status of the surroundings of the vehicle (suburb, rural, urban, parking garage, inside building, outside building, on the street, etc.), surrounding building types (residential, apartment buildings, public place, motel, etc.) and more. This information pertaining to the vehicle may be determined by the vehicle itself, by a device nearby (e.g., the key fob, smartphone, or another device), by a server 150, or by some other device.

Vehicle situational criteria can be analyzed to determine whether a honk should accompany locking or unlocking of the vehicle at the request of the user. For instance, where the vehicle is in a residential area at night (e.g., outside work hours), the vehicle may determine not to honk when locking. The specific criteria that must be met may be set arbitrarily by the user, such that the user can define the situations in which he or she does not want the vehicle to honk when it is locked. This can be done via a user interface of the vehicle, device, and/or server. Example factors may include whether the vehicle is in a residential vs commercial area, whether it is during work hours or not, and whether it is a weekday or weekend/holiday. Other considerations may apply as well.

Whether one or more vehicle situational criteria are met can be determined in at least three different ways, as described below.

First, whether the vehicle situational criteria are met can be determined based on data collected by the vehicle itself via one or more vehicle sensors 102. As described above, vehicle sensors can include cameras, GPS, clocks, etc., that can gather data about the surroundings of the vehicle. If one of the criteria is that the location be a residential area, then the vehicle may analyze images captured by one or more cameras to determine whether the surroundings include houses. If so, the criteria "residential area" may be met.

Where the vehicle sensors are used to determine whether the vehicle situational criteria are met, the vehicle may determine a separate set of "vehicle based conditions" that are analyzed. These can include, for example, the vehicle location in longitude/latitude, GPS coordinates, a vehicle determined time, and various other vehicle determined metrics or "vehicle based conditions." These vehicle based conditions may be similar or identical to the "vehicle situational criteria" described above, with the caveat that the vehicle conditions are metrics determined by the vehicle itself, whereas the vehicle situational criteria are objective, and not dependent on the source of gathered data. Data corresponding to these vehicle based conditions may then be gathered by the sensors of the vehicle. As such, the vehicle based conditions may refer to the categories of information that can be gathered (e.g., location, time, surroundings etc.), and the sensors may gather the data based on the determined categories of information.

In a second scenario, determining whether one or more vehicle situational criteria are met can be done based on data collected by a remote computing device, such as the key fob 120, smartphone 130, or another such device. The remote device may have one or more associated "device conditions" that can be used to determine whether the vehicle situational criteria are met, and ultimately whether or not the vehicle 100 should honk along with a locking action. For instance, the remote device "device conditions" may include a determination of the device's own location, device determined time, and/or other data specific to the device itself. This device specific data may be compared to a set of "device condition," and if the device conditions are met, that may indicate that the vehicle situational criteria are met, and therefore that the vehicle should not honk when carrying out the lock or unlock functions.

Using data from the remote device may come into play, for example, if the vehicle sensors are broken, unresponsive, or otherwise cannot provide the data required to determine whether the vehicle is in a residential area at night (e.g., that the vehicle situational criteria are met). The system may instead look to see whether the remote device itself can provide information to be used for this determination instead. The remote device may have one or more sensors, systems, or components that provide a location and time of the device, which can be compared to a threshold location and/or time (i.e., the device conditions). In some cases it may be assumed that the device is located in a similar location to the vehicle. And as such, if the device location and time indicate that the vehicle situational criteria are met, then the vehicle should not honk. The remote device may transmit to the vehicle the device data itself, and/or a message indicating that the device conditions are met, and/or a message indicating that the vehicle situational criteria are met according to data determined by the remote device. The vehicle may then take the appropriate action by disabling or preventing the honk from occurring.

In a third scenario, determining whether one or more vehicle situational criteria are met can be done based on data collected by the server 150. This may occur, for instance, when either or both of the vehicle sensors 102 and the remote device cannot determine that the vehicle meets the vehicle situational criteria.

Under normal operation, the vehicle 100 may be configured to transmit vehicle specific data to the server 150 at regular or irregular intervals, either based on the passage of time or some event occurring with respect to the vehicle (e.g., every hour, every day, upon startup and shutdown of the engine, when the processor detects an abnormal sensor value, etc.). For instance, the vehicle may transmit its location, battery status, one or more performance metrics, etc. to the server 150 for various purposes. This data may be used to determine when a vehicle component is likely to fail or needs replacement/repair, to alert the driver or owner when maintenance is required, and more.

In some embodiments of the present disclosure, the data transmitted from the vehicle to the server may be used to determine whether the vehicle situational criteria are met (i.e., whether the vehicle should honk when it receives a lock command or not). As such, the server 150 may have a set of "remote server conditions" that the data received by the server can be compared against. If the received data meets one or more of the remote server conditions, then the server 150 may determine that the vehicle situational criteria are met. The server 150 may then transmit this determination to the vehicle so that the vehicle does not honk when the lock command is received. Alternatively, rather than the server itself determining that the vehicle situational criteria are met, the server may instead transmit a message to the vehicle including the remote server conditions and/or the data. The vehicle itself can then determine that the vehicle situational criteria are met, either based on the remote server conditions and data, or based on the message indicating that the conditions are met received from the server.

In a simplified example, the three scenarios listed above may play out as follows. The vehicle situational criteria may include a determination that the vehicle is in a residential area, and that the time is later than 8:00 pm. When the vehicle receives a lock command, it may first look to the vehicle sensor data to determine whether the vehicle is in a residential area, and whether the time is later than 8:00 pm. This can include using vehicle cameras, GPS, clock, etc. to determine whether one or more "vehicle based conditions: are met. The vehicle may associate a confidence value with its gathered data, such that there is an overall confidence value of whether the vehicle based conditions are met, and ultimately whether the vehicle is in a residential area or not and whether the time is later than 8:00 pm or not. If either the confidence value is below a threshold level, or the sensors are simply not available or cannot provide the required data, the vehicle may instead look to the device and/or server to determine whether the vehicle is in a residential area past 8:00 pm.

The device may be the device from which the lock command was received, or it may be a difference device associated with the device from which the lock command was received. This device may have its own sensors that can gather data about the location and time, which can be used to determine whether one or more "device conditions" are met. If the device location and time indicate that the device is in a residential area after 8:00 pm, this may be used determine that the device conditions are met, and therefore that the vehicle situational criteria are met. The device data may have its own corresponding confidence values, and as such there may be instances where the device cannot determine with sufficient confidence whether the vehicle is in a residential area after 8:00 pm.

In this case, the vehicle may then look to the server to determine whether one or more "remote server conditions" are met, such that there is a high confidence that the vehicle is in a residential area after 8:00 pm. The server may have a record of the location of the vehicle that has been transmitted to the server over time. The server may compare the information it has stored about the vehicle to one or more remote server conditions (e.g., comparing the last known location of the vehicle to a map segmented into residential and non-residential areas). The server can then determine whether the remote server conditions are met, and therefore that the vehicle situational criteria are also met because the vehicle is in a residential area after 8:00 pm. If the conditions are met, then the server may transmit a message to the vehicle including this determination and/or the stored data, such that the vehicle itself can ultimately determine whether the vehicle situational criteria are met.

As such, via these three sources of information the vehicle can determine whether it is located in a residential area after 8:00 pm based on its own sensor data, based on the remote device data, or based on the remote server data.

It should be noted that in some examples only one source of information may be needed to ultimately determine whether the vehicle situational criteria are met, while in other examples two or all three sources of information may be considered. Further, each source may have a corresponding confidence value, and some embodiments may include an analysis of determinations using the vehicle data, the device data, and/or the server data so as to come to determination of whether the vehicle situational criteria are met with the greatest level of confidence.

It should also be noted that in some examples each source of information may determine whether the "vehicle situational criteria" is met based on the same metrics (i.e., whether the location is residential and the time is after 8:00 pm). For instance, as noted above, all three sources of information determined whether the vehicle was in a residential area past 8:00 pm.

However in other examples, each source of information may have a different set of conditions that need to be met to determine that the "vehicle situational criteria" is met. For example, the vehicle based conditions may include a determination of whether the location is residential or not (based on camera data), and whether the time as measured by the vehicle is later than 8:00 pm, to determine whether the criteria are met. But the remote device may instead have device conditions that include determining that the GPS location of the device is in a predetermined zone or area, and that the time as measured by the device is later than 8:00 pm. The device conditions in this case are different than the vehicle based conditions. And further, the server may have a set of remote server conditions that include determining whether a previous location of the vehicle was residential (rather than a current location), and that a time as measured by the server is later than 8:00 pm. As such, there may be separate and distinct conditions that must be met for each source of information, and each may independently come to the conclusion that the vehicle situational criteria are met.

Once the processor 110 determines that the vehicle situational criteria is met (either via vehicle sensor data, remote device data, or server data), the processor 110 may transmit a second alert to either the first device that transmitted the lock request, or a second device that corresponds to the first device. In practice, this may mean transmitting a second alert to either or both of the key fob 120 (the first device) and the smartphone 130 (the second device). In some examples, the second alert may be transmitted if and only if the vehicle situational criteria is determined to be met.

The second alert may be transmitted via any wireless protocol, including via Bluetooth, a cellular connection, Wi-Fi, and more. In some examples, responsive to determining that the device is within the threshold range of the vehicle the processor may transmit the first alert to the device(s) via Bluetooth. And then responsive to determining that the device is outside the threshold range of the vehicle, the processor may transmit the second alert to the device(s) via a cellular connection.

In some examples, transmission using a cellular connection may include the vehicle transmitting an alert to the server 150, and the server 150 then transmitting a message to the device.

The second alert may be similar or identical to the first alert, in that the second alert may indicate the lock status of the vehicle with a visual cue, audio cue, and/or haptic feedback.

In some examples, the processor 110 may determine that the first device and/or second device is outside the threshold range, and that the vehicle situational criteria are not met. For instance, using the example above this may occur when the vehicle is determined to be in a non-residential area and/or the time is before 8:00 pm. In response to this determination, the processor may transmit a third alert to the first and/or second device. The third alert may include an indication that the vehicle will honk when it completes the lock action. This can again be indicated using any of a visual cue, audio cue, or haptic feedback.

The third alert may further give the user an option to disable the honk, such that the vehicle does not honk even though the vehicle situational criteria are not met. The disabling of the honk may be a one-time event, or may be saved such that the vehicle does not honk under similar or identical future circumstances.

The user may input to the first and/or second device an instruction to disable the honk, which may then be transmitted back to the vehicle. The vehicle may then receive the instruction, and responsively prevent the vehicle honk from occurring when the vehicle lock function is carried out.

Figure 2:
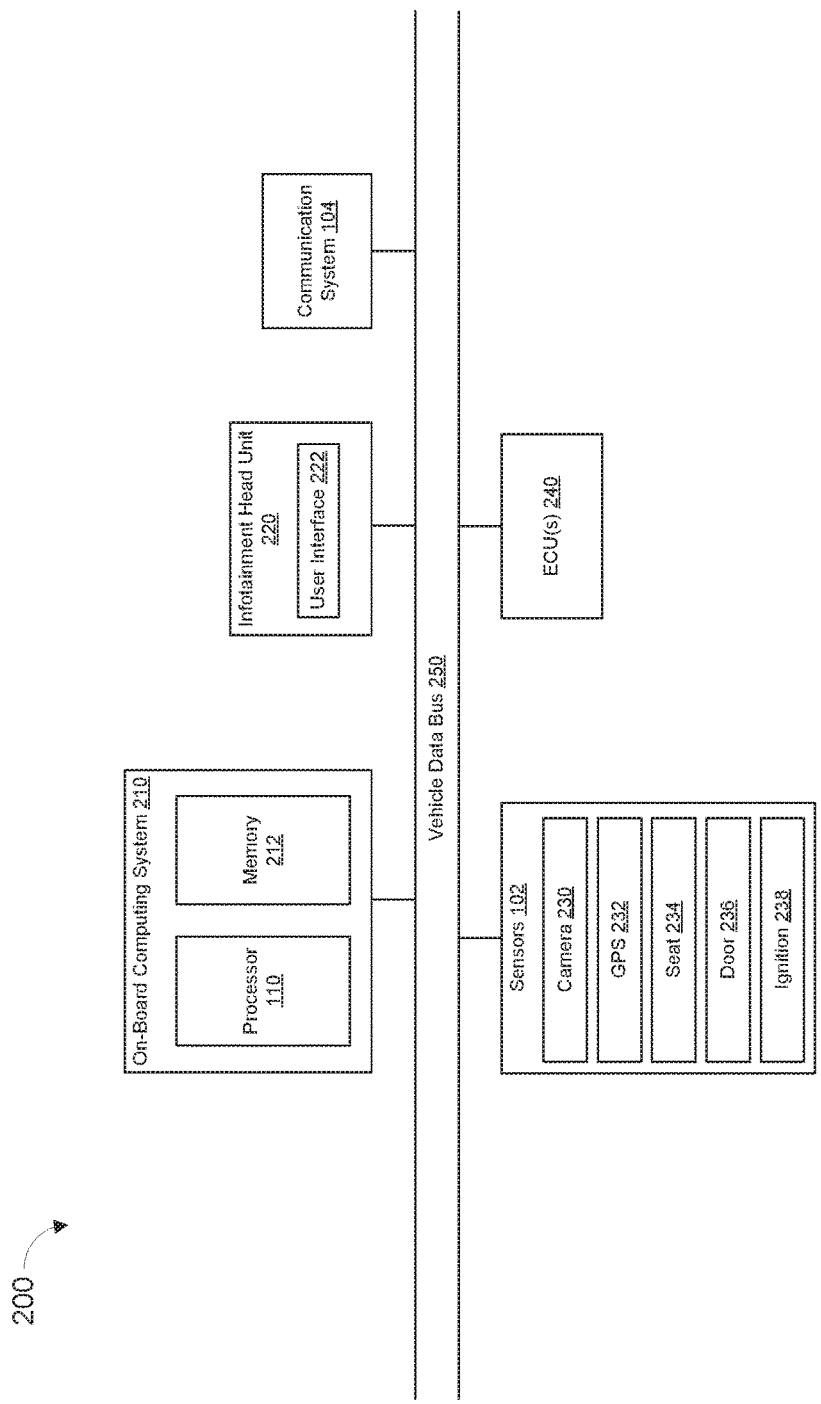
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, communication system 104, sensors 102, electronic control unit(s) 240, and vehicle data bus 250.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display and user interface 222. User interface 222 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a display of vehicle 100.

Communication system 104, as described above, may include one or more antennas, processors, modules, and other electronic components configured to facilitate communication between the processor 110 and one or more other devices or systems. As such, communication system may be configured to operate using any communication protocol.

Sensors 102 may be arranged in and around the vehicle 100 in any suitable fashion. In the illustrated example, sensors 102 include one or more cameras 230, a GPS unit 232, one or more seat sensors 234 for detecting whether one or more vehicle seats are occupied, one or more door sensors 236 for detecting the status of the vehicle doors, and an ignition sensor 238 for detecting the status of the ignition of the vehicle. Other sensors may be included as well.

The ECUs 240 may monitor and control subsystems of vehicle 100. ECUs 240 may communicate and exchange information via vehicle data bus 250. Additionally, ECUs 240 may communicate properties (such as, status of the ECU 240, sensor readings, control state, error and diagnostic codes, etc.) to and/or receive requests from other ECUs 240. Some vehicles 100 may have seventy or more ECUs 240 located in various locations around the vehicle 100 communicatively coupled by vehicle data bus 250. ECUs 240 may be discrete sets of electronics that include their own circuit(s) (such as integrated circuits, microprocessors, memory, storage, etc.) and firmware, sensors, actuators, and/or mounting hardware.

Vehicle data bus 250 may include one or more data buses that communicatively couple the on-board computing system 210, infotainment head unit 220, communication system 104, sensors 102, ECUs 240, and other devices or systems connected to the vehicle data bus 250. In some examples, vehicle data bus 250 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7). In some examples, the CAN bus may be shared with the CAN-FD bus.

Figure 3:
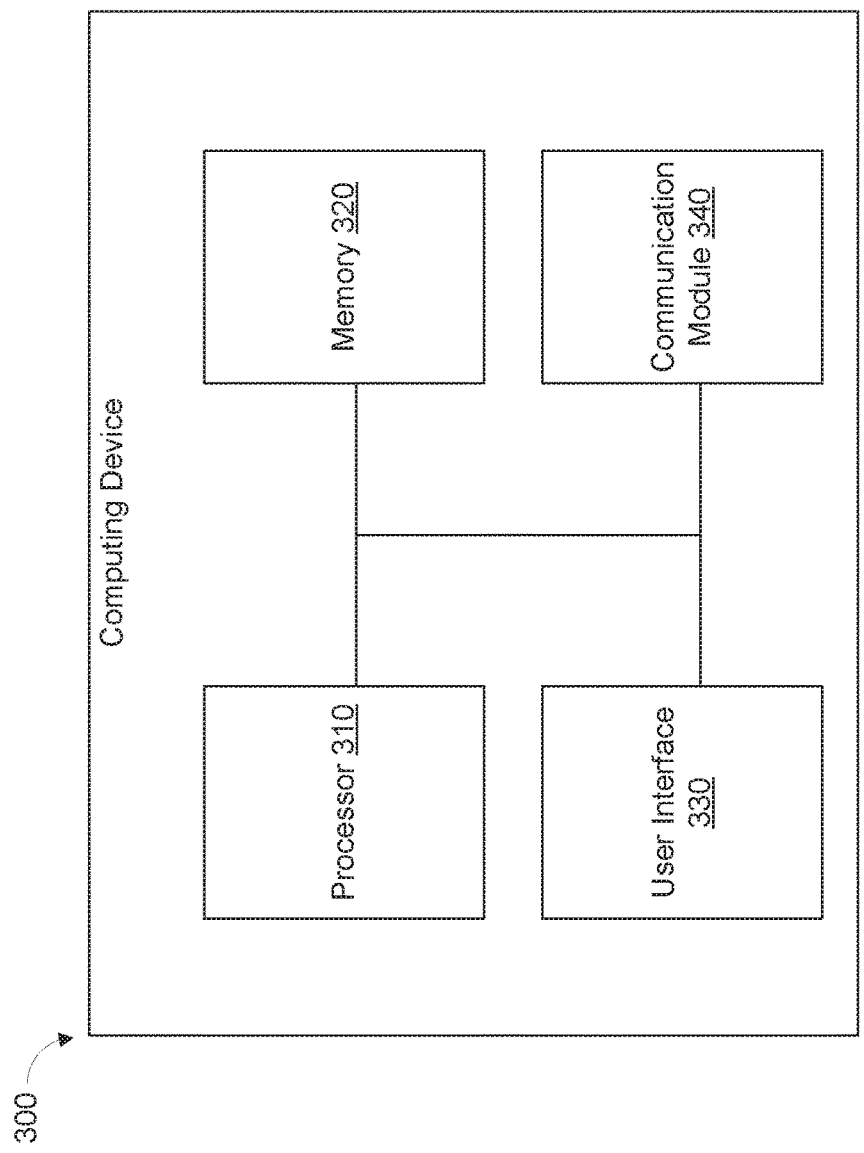
FIG. 3 illustrates an example block diagram of a computing device according to embodiments of the present disclosure.

FIG. 3 illustrates an example block diagram of a computing device 300 according to embodiments of the present disclosure. One or more features of computing device 300 may be included in vehicle 100, key fob 120, smartphone 130, server 150, and various other remote devices or systems described herein.

Computing device 300 may include a processor 310 and a memory 320, which may be similar or identical to the processor 110 and/or memory 212 described with respect to FIGS. 1 and 2. Computing device 300 may also include a user interface 330 configured to provide the ability for a user to interact with and control computing device 300. User interface 330 may include one or more input and/or output devices to receive input from and display information to a user. The input devices may include, for example, a control knob, an instrument panel, a digital camera for image capture and/or visual command recognition, a touch screen, an audio input device (e.g., microphone), buttons, or a touchpad. The output devices may include one or more displays, (e.g., a liquid crystal display (LCD), an organic light emitting diode (OLED) display, a flat panel display, a solid state display, etc.), and/or speakers.

Computing device 300 may further include one or more communication modules 340. Communication module 340 may allow wired or wireless communication with one or more other computing devices or systems using one or more communication protocols. The communications module may include wired or wireless network interfaces to enable communication with external networks. The communications module may also include hardware (e.g., processors, memory, storage, etc.) and software to control the wired or wireless network interfaces. The communications module may include, among others, an NFC module, a Bluetooth module, a GPS receiver, a dedicated short range communication (DSRC) module, a WLAN module, and/or a cellular modem, all electrically coupled to one or more respective antennas.

Figure 4:
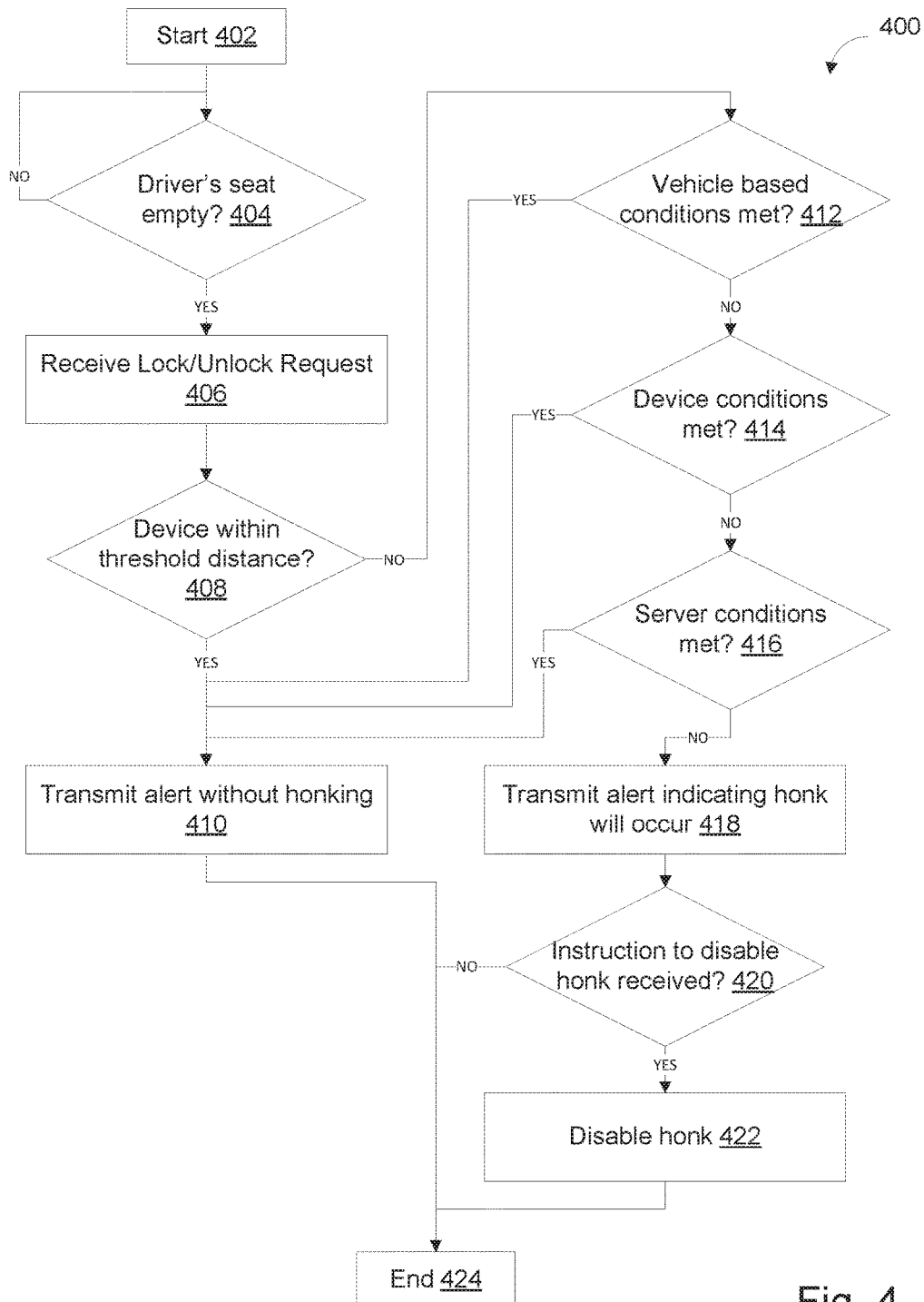
FIG. 4 illustrates a flowchart of an example method according to embodiments of the present disclosure.

FIG. 4 illustrates an example method 400 according to embodiments of the present disclosure. Method 400 may enable a vehicle to provide a discrete alert to a driver that the vehicle is locked based on the environment and surroundings of the vehicle. The flowchart of FIG. 4 is representative of machine readable instructions that are stored in memory and may include one or more programs which, when executed by a processor may cause vehicle 100 and/or one or more systems or devices described herein to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining whether the driver's seat (and/or one or more other vehicle seats) is unoccupied.

At block 406, method 400 may include receiving an unlock or lock request. This may be received from a remote computing device, such as the key fob and/or smartphone described above.

At block 408, method 400 may include determining whether a remote computing device is within a threshold distance or range of the vehicle. The remote computing device may be a first device from which the lock or unlock request was received, or it may be a second device that corresponds to the vehicle or first device. If the device is within the threshold distance from the vehicle, method 400 may include transmitting an alert to the first and/or second device. It may also include locking or unlocking the car, and the transmitted alert may include a lock status of the vehicle. The vehicle may also disable or prevent a honk from occurring when the vehicle locks or unlocks at this stage.

If the device is outside the threshold distance or threshold range, method 400 may include determining whether one or more vehicle situational criteria are met. This can be done in three separate ways, as shown by blocks 412, 414, and 416 of method 400. At block 412, method 400 may include determining whether one or more vehicle based conditions are met. This can include gathering data using one or more vehicle sensors.

If the vehicle conditions are not met, method 400 may include determining whether one or more device conditions are met. This can include gathering data using sensors corresponding to the device that transmitted the lock/unlock request, or an associated device.

If the device conditions are not met, method 400 may include determining whether one or more server conditions are met. If any of the vehicle based conditions, device conditions, and/or server conditions are met, that may indicate that the vehicle situational criteria are met. In this case, method 400 may proceed to block 410 and transmit an alert to the device(s).

However if none of the vehicle based conditions, device conditions, and server conditions are met, method 400 may include transmitting a separate alert to the device(s) at block 418 indicating that a honk will occur along with performing the locking or unlocking function (whichever was requested). The method may then allow the user or driver to input a command via the device to disable or prevent the honk at block 420. If no instruction is received after a threshold delay, the vehicle may perform the lock/unlock function and honk. But if an instruction to disable the honk is received, the vehicle may disable the honk at block 422. Method 400 may then end at block 424.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   sensors;
   a communication system; and
   a processor configured to:
   receive a lock request from a first device;
   responsive to determining that the first device is within a threshold range, transmit a first alert to a second device; and
   responsive to determining that the first device is outside the threshold range (i) determine that a vehicle situational criteria is met, and (ii) transmit a second alert to the second device,
   wherein determining that the vehicle situational criteria is met comprises:
   determining one or more remote server conditions corresponding to the vehicle;
   receiving data corresponding to the one or more remote server conditions from a remote server; and
   determining that vehicle situational criteria is met based on the one or more remote server conditions and the received data.

2. The vehicle of claim 1, wherein the first device is a key fob, and the second device is a smartphone communicatively coupled to the vehicle.

3. The vehicle of claim 1, wherein the first alert is transmitted via a Bluetooth connection to the second device, and wherein the second alert is transmitted via a cellular connection to the second device.

4. The vehicle of claim 1, wherein determining that the vehicle situational criteria is met comprises:
   determining one or more vehicle based conditions;
   gathering data corresponding to the one or more vehicle based conditions via the sensors; and
   determining that vehicle situational criteria is met based on the vehicle based conditions and the gathered data.

5. The vehicle of claim 1, wherein determining that the vehicle situational criteria is met comprises:
   determining one or more device conditions corresponding to the second device;
   receiving data corresponding to the one or more device conditions from the second device; and
   determining that vehicle situational criteria is met based on the one or more device conditions and the received data.

6. The vehicle of claim 1, further comprising a driver's seat, wherein the processor is further configured to:
   determine that the driver's seat is unoccupied; and
   transmit the first alert to the second device responsive to (i) determining that the first device is within the threshold range, and (ii) determining that the driver's seat is unoccupied.

7. The vehicle of claim 1, wherein the processor is further configured to:
   responsive to determining that the first device is outside the threshold range, (i) determine that the vehicle situational criteria is not met, and (ii) transmit a third alert to the second device, wherein the third alert indicates that a honk will occur when the vehicle is locked;
   receive an instruction to prevent the honk from occurring from the second device in response to transmitting the third alert; and
   prevent the honk from occurring when the vehicle is locked.

8. A vehicle comprising:
   sensors;
   a communication system; and
   a processor configured to:
   receive a lock request from a remote device;
   responsive to determining that the remote device is within a threshold range, transmit a first alert to the remote device;
   responsive to determining that the remote device is outside the threshold range:
   determine that a vehicle situational criteria is met, and responsively transmit a second alert to the remote device;
   determine that the vehicle situational criteria is not met, and responsively transmit a third alert to the remote device, wherein the third alert indicates that a honk will occur when the vehicle is locked;
receive an instruction to prevent the honk from occurring from the remote device in response to transmitting the third alert; and
prevent the honk from occurring when the vehicle is locked.

9. The vehicle of claim 8, wherein the remote device is a smartphone communicatively coupled to the vehicle.

10. The vehicle of claim 8, wherein the first alert is transmitted via a Bluetooth connection to the remote device, and wherein the second alert is transmitted via a cellular connection to the remote device.

11. The vehicle of claim 8, wherein determining that the vehicle situational criteria is met comprises:
determining one or more vehicle based conditions;
gathering data corresponding to the one or more vehicle based conditions via the sensors; and
determining that vehicle situational criteria is met based on the vehicle based conditions and the gathered data.

12. The vehicle of claim 8, wherein determining that the vehicle situational criteria is met comprises:
determining one or more device conditions corresponding to the remote device;
receiving data corresponding to the one or more device conditions from the remote device; and
determining that vehicle situational criteria is met based on the one or more device conditions and the received data.

13. The vehicle of claim 8, wherein determining that the vehicle situational criteria is met comprises:
determining one or more remote server conditions corresponding to the vehicle;
receiving data corresponding to the one or more remote server conditions from a remote server; and
determining that vehicle situational criteria is met based on the one or more remote server conditions and the received data.

14. The vehicle of claim 8, further comprising a driver's seat, wherein the processor is further configured to:
determine that the driver's seat is unoccupied; and
transmit the first alert to the remote device responsive to (i) determining that the remote device is within the threshold range, and (ii) determining that the driver's seat is unoccupied.

15. A method comprising:
receiving, by a vehicle processor, a lock request from a remote device;
responsive to determining that the remote device is within a threshold range, transmitting a first alert; and
responsive to determining that the remote device is outside the threshold range:
determining that a vehicle situational criteria is met, and responsively transmitting a second alert;
determining that the vehicle situational criteria is not met, and responsively transmitting a third alert, wherein the third alert indicates that a honk will occur when a vehicle is locked;
receiving an instruction to prevent the honk from occurring in response to transmitting the third alert; and
preventing the honk from occurring when the vehicle is locked.

16. The method of claim 15, wherein the first alert is transmitted via a Bluetooth connection, and wherein the second alert is transmitted via a cellular connection.

17. The method of claim 15, wherein determining that the vehicle situational criteria is met comprises:
determining one or more device conditions corresponding to the remote device;
receiving data corresponding to the one or more device conditions from the remote device; and
determining that vehicle situational criteria is met based on the one or more device conditions and the received data.

* * * * *